Sept. 24, 1957 S. G. ESKIN 2,807,423
GAS OVEN THERMOSTATIC VALVE
Filed Jan. 19, 1955
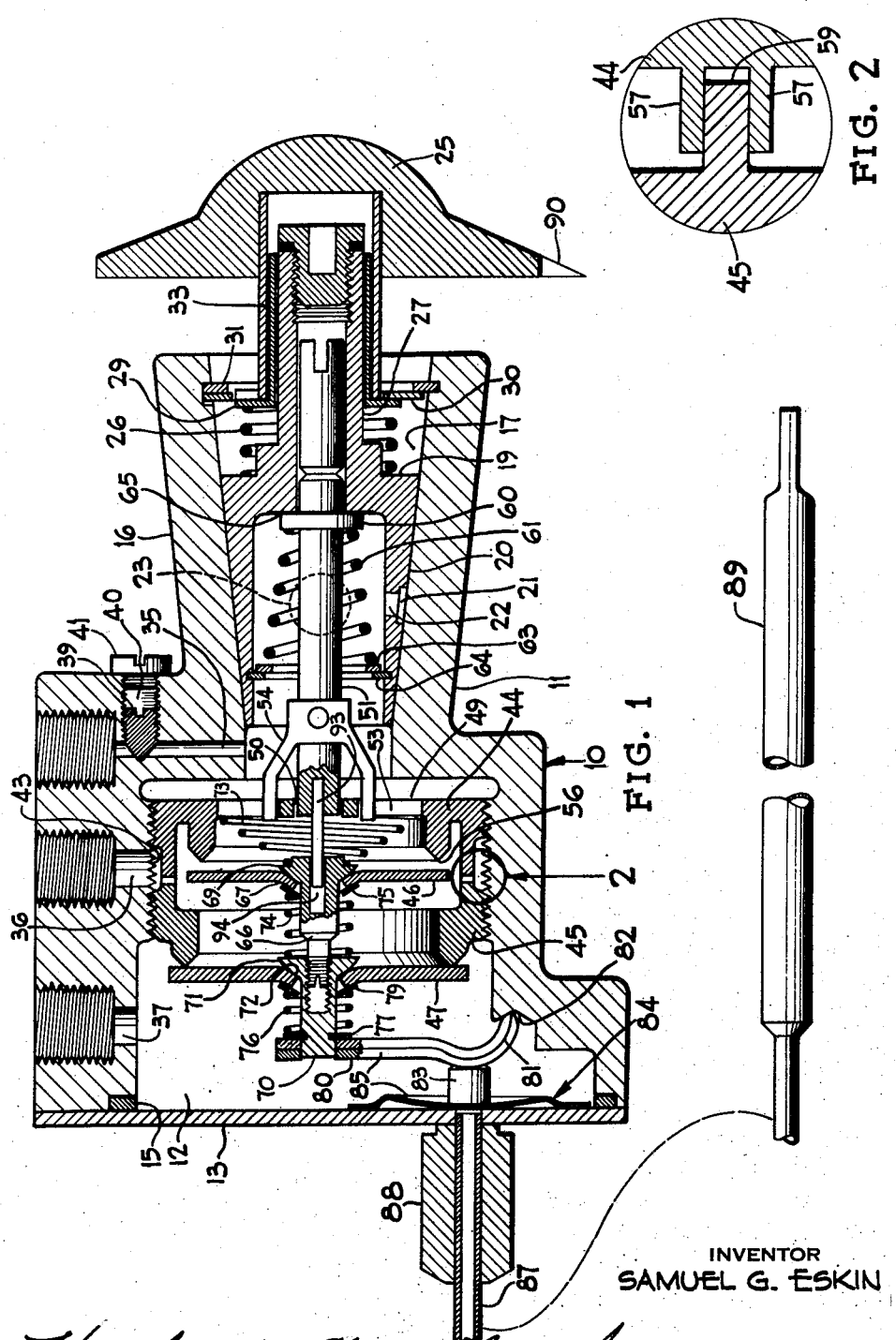
INVENTOR
SAMUEL G. ESKIN
BY *[signature]* ATTORNEYS

2,807,423

GAS OVEN THERMOSTATIC VALVE

Samuel G. Eskin, Chicago, Ill., assignor to The Dole Valve Company, Chicago, Ill., a corporation of Illinois Application January 19, 1955, Serial No. 482,849

15 Claims. (Cl. 236—99)

This invention relates to improvements in gas burner thermostatic valves and more particularly relates to such valves for controlling the temperatures of gas range ovens.

Heretofore, gas range ovens have been heated by single orifice, single Venturi gas burners having a plurality of ports to provide the B. t. u. capacity required for the desired heating range of the oven. Thermostats have been provided for controlling the burner by a throttling action and a by-pass usually by-passes the thermostatic valve to provide a low temperature heating range for the valve.

With such valves and burner arrangements when the desired temperature setting is reached, the thermostat moves the thermostatic valve toward a shut-off position and thus shuts off the flow of gas through the main port of the valve but still accommodates by-pass gas to flow to the burner and burn at the ports of the burner with smaller bead-like flames.

With these types of valves and a well insulated oven, the minimum temperature that can be obtained is from 275 to 300° F., depending upon the setting of the by-pass passageway.

It is, however, desirable that lower temperatures be obtained, such as a temperature range of 200° F. or even lower and that this low temperature range be under the control of the thermostatic valve.

This has been accomplished by providing a thermostatic valve having two valves in series, each operated by a single thermostat for certain temperature ranges, one controlling the flow of gas to an auxiliary burner and the other controlling the flow of gas to a main burner and each operating in accordance with the temperature range and setting of the thermostatic element.

With such a valve gas may be supplied to a main burner with a relatively high B. t. u. output, high enough to maintain the oven temperature at the maximum setting of the thermostat, and to an auxiliary burner with a much lower B. t. u. output, sufficient to provide the desired oven temperature for the setting of the thermostat at temperatures below those provided by the first valve through the main burner. A by-pass gas supply line may also be provided to maintain the auxiliary burner lit upon closing of the two thermostatic valves.

A principal object of my invention, therefore, is to provide a thermostat for gas range ovens accommodating full thermostatic control of the oven temperatures at high and low temperature ranges.

A further object of my invention is to provide a thermostatic valve for gas oven burners having two series valves, one for controlling the flow of gas to an auxiliary burner and the other controlling the flow of gas to a main burner and each being thermostatically operated by a single thermostatic element in the selected temperature ranges of the valves.

Still another object of my invention is to provide a thermostatic valve for gas burners having two thermostatically operated valves, a rotatable plug valve for admitting gas to the thermostatically operated valves and an operative connection between the plug valve and thermostatically operated valves, for varying the temperature range of the valves upon turning of the plug valve to its various "on" positions.

A further and more specific object of my invention is to provide a thermostatically operated valve having a high temperature control range and a low temperature control range, with individual thermostatically operated valves operated by a single thermal element for controlling the temperatures at the control ranges of the valves in accordance with the setting of the thermostat.

Still another object of my invention is to provide a dual range thermostatically operated valve in which gas is admitted to the valve by a rotary type of plug valve in which rotatably movable axially aligned valves operated by a single thermal element are provided for high and low temperature control and in which the operating temperature range of the thermal element is controlled by turning movement of the plug valve.

These and other objects of my invention will appear from time to time as the following specification proceeds and with reference to the accompanying drawing wherein:

Figure 1 is a cross-sectional view taken through a valve constructed in accordance with my invention and showing a bulb type thermostatic element for controlling operation of the valve; and Figure 2 is an enlarged fragmentary detail sectional view taken in the region of the circle 2 in Figure 1 and looking at the valve seating members in the direction of the arrow in order to show the connection between the valve seating members accommodating vertical adjustment of one seating member with respect to the other.

Referring now in particular to Figure 1 of the drawings, I have shown a thermostatic valve 10 including a valve body 11 having a central valve chamber 12 closed by an end plate 13 secured to an end of the valve body and sealed thereto as by an annular seal 15.

The valve body 11 also has an inverted frustoconical boss 16 extending therefrom and having an inverted frusto-conical passageway 17 therein leading to the valve chamber 12. The frusto-conical passageway 17 forms a frusto-conical seat for a plug or rotary valve 19 having a valve face 20 rotatably engaged with the passageway or seat 17.

The plug valve 19 may be of any well known form commonly used to control the flow of gas to gas burners and has an outwardly opening passageway 21 leading around the valve face 20 for a portion of the circumference thereof, and having communication with the hollow interior of the valve 19 and the valve chamber 12 through a port 22. An inlet 23 leads through the boss or projection 16 to the frusto-conical seat 17 thereof and has communication with the passageway 21 upon turning of a knob 25 to turn the rotary or plug valve 19 to its various "on" positions.

The rotary valve 19 is retained in sealing engagement with the frusto-conical seat 17 by compression spring 26 encircling an outwardly projecting hollow boss 27 of said valve and seated on said valve at one end and against the flange of a flanged sleeve 29 at its opposite end. The flanged sleeve 29 encircles the boss 27 and extends outwardly therealong and is retained within the boss 16 as by a washer 30 retained in position within said boss by a snap ring 31.

The knob 25 is carried on the outer end of a sleeve 33 encircling the flanged sleeve 29 and keyed or otherwise secured thereto. The flanged sleeve 29 in turn is keyed or otherwise secured to the hollow boss 27, for turning the same upon turning movement of the knob 25 to turn the rotary valve 19 to its various "on" positions.

The valve body 11 is shown as having three spaced outlet passageways, one being a by-pass passageway 35 and leading from the valve body adjacent the lower or discharge end of the rotary valve 19, a second outlet passageway being an auxiliary burner passageway 36 and leading from the valve chamber 12 and spaced downstream from the by-pass passageway 35; and the third being a main burner outlet 37 and leading from the valve chamber 12 adjacent the downstream end thereof. An adjustable metering pin 39 is threaded within a threaded passageway 40 to intersect the by-pass passageway 35 and vary the flow rate of gas passing through said by-pass passageway, as desired. The threaded passageway 40 is closed by a screw 41, which affords access to the metering pin 39.

The valve chamber 12 is shown as having a threaded wall portion 43 extending for a portion of the length thereof and extending along opposite sides of the outlet 36. The wall portion 43 is adapted to have two spaced annular valve seating members 44 and 45 threaded therein. The valve seating member 44 forms a seat for an auxiliary burner control valve 46, thermostatically controlled to control the flow of gas through the auxiliary burner outlet 36. The valve seating member 45 forms a seat for a main burner control valve 47, thermostatically controlled to control the flow of gas through the main burner outlet 37.

The valve seating member 44 is of an annular form open at its top and having a transverse rib 49 extending across the upstream side thereof and having a central opening 50 therein to accommodate a shaft or adjusting member 51 to pass thereinto. The rib 49 is slotted, as indicated by reference character 53 to receive the forked ends of an adjusting yoke 54, pinned or otherwise secured to the shaft or adjusting member 51 and extending therealong into engagement with the slotted portions 53 of the rib 49, for turning the valve seating member 44 upon turning movement of the shaft 51.

The valve seating member 44 has a downwardly facing annular seat 56 spaced inwardly of the wall thereof and adapted to be engaged by the valve 46. The seating member 44 also has spaced projections 57 depending from the annular wall thereof, for engaging upward projecting members 59 projecting upwardly from the annular wall of the valve seating member 45 (see Figure 2). Turning movement of the shaft or rod 51 will thus turn the two valve seating members 44 and 45 together.

It should here be noted that the valve seating members 44 and 45 are separate seating members, and are individually threaded within the threaded wall 43, and that the slidable interengaging connection between said valve seating members affords longitudinal adjustment therebetween so as to enable the valve seating members to be spaced in the desired spaced relationship for proper operation of the valve.

The operating member or shaft 51 is shown as having a flange 60 intermediate its ends engaged at its undersurface by a conical spring 61 seated at its end opposite the flange 60 on a washer 63, retained within the hollow interior portion of the plug valve 19 as by a snap ring 64. The conical spring 61 biases an upper face of the flange 60, which may be radially serrated, into engagement with a downwardly facing radially serrated face 65 of the hollow interior portion of the plug valve 19 to turn the shaft or operating member 51 upon turning movement of the knob 25.

The valve 46 is of a generally disk-like form, open at its center to accommodate a stem 66 to pass therethrough and having a downwardly pressed central portion 67 forming a generally spherical socket on the upstream face of the valve for engagement with a corresponding surface formed on a head 69 of the stem 66.

The valve 47 is like the valve 46 and has a stem 70 passing therethrough having a head 71 having rocking engagement with a spherical socket 72 formed in the upstream face of the valve. The stem 70 is shown as being threaded on the stem 66, to accommodate spacing of the valves the required distances apart to cooperate with the seating members 44 and 45 at the desired temperature ranges of operation of the two valves 46 and 47, so the valve 46 may open prior to opening of the valve 47. A spring 73 seated within the seating member 44 inwardly of the annular seat 56 thereof, engages the head 69 of the stem 66 to urge the two valves 46 and 47 in valve opening directions.

A coil spring 74 is shown as being seated on the head 71 at one end and on a generally conical washer 75 at its opposite end to bias the socket 67 into engagement with the head 69 and accommodate self-alignment of the valve when moving in a valve closing direction, and also to accommodate relative movement of the stems 66 and 67 with respect to the valve 46 to enable the valve 46 to close after the valve 47 has been closed.

In a like manner, the valve stem 70 is encircled by a compression spring 76 abutting the snap ring or washer 77 adjacent the outer end of said stem and abutting a conical washer 70 at its opposite end to bias the socket 72 into engagement with the head 71 and accommodate self alignment of the valve, and also to accommodate relative movement of the stem 70 with respect to the valve 47.

A bimetal thermostatic compensating and amplifying lever 80 is shown as being mounted on the lower end of the stem 70 and as abutting the snap ring or washer 77. The lever 80 extends outwardly from the stem 70 toward the outer edge of the valve chamber 12. The compensating and amplifying lever 80 has a generally hook-like curved end portion 81 fulcruming at its end about a generally V-shaped recess 82 formed in the wall of the valve chamber 12 and facing toward the end cap or cover 13.

The under surface of the rounded portion 81 of the compensating and amplifying lever 80 is shown as being engaged by a button 83 of a thermal element 84, inwardly of the fulcrum point 82. The button 83 is secured to and extends outwardly from the center of a shallow disk or diaphragm 85 of the thermal element 84. The thermal element 84 is herein shown as being a bulb type of thermal element, which may be charged with a suitable organic thermal material.

The diaphragm 85 is welded or otherwise secured to the inner side of the cover plate 13 adjacent its margin, and the interior of said diaphragm with the inner side of said cover plate forms an expansible chamber for extending the diaphragm 85 and moving the button 83 in a direction to fulcrum the bimetallic compensating and amplifying lever 81 about its fulcrum point at 82 upon predetermined temperature rises. A tube 87 has communication with the chamber formed between the cover 13 and the under side of the diaphragm 85 and is secured to the cover plate 13 as by fitting 88 welded or otherwise secured to the outside of the cover 13 and projecting therefrom. The tube 87 leads to and is connected with a bulb 89 of the thermal element 84 which may be located in a suitable location within the gas range oven to control the temperature of the oven in accordance wtih the position of the knob 25 and adjustment of the thermostat.

The knob 25 may have a pointed 90 extending therefrom for cooperation with a dial (not shown) on the gas range to indicate the positions of the plug valve 19 and the temperature range of adjustment of the thermostat.

The stem 66 of the valve 46 is shown as being connected with the shaft or operating rod 51 as by a tongue 93 secured to and depending from the lower end portion of the shaft 51 and having slidable engagement with a rectangular slotted portion 94 of the stem 66, of sufficient length to accommodate relative rectilinear movement of the stem 66 along the tongue 93.

In operation of the valve, the knob 25 is turned from its "on" position to admit gas from the inlet 23 into and along the annular passageway 21 to the valve chamber and by-pass port 35 through the hollow interior of the plug valve 19. During this turning movement of the knob 25 and plug or rotary valve 19, the valve seats 44 and 45 and valves 46 and 47 will turn together. This will effect axial movement of the valve seating members 44 and 45 toward the rotary valve 19, to first open the valve 46 and admit gas through the outlet 36, to supply gas to the auxiliary gas burner (not shown) and maintain the oven at a selected low temperature range as for example 225° F. At this temperature range of adjustment, the valve 47 will be closed.

Assuming that the knob 25 has been turned to set the thermostat to shut off the valve 46 at a temperature of 225°, when the oven has reached this temperature, the diaphragm 85 will be extended with respect to the cover plate 13, pivoting the compensating and amplifying lever 80 in a direction to move the valve stems 70 and 66 in valve closing directions. Since the valve 47 is already in engagement with its seat, the valve stems 70 and 66 will be moved relative to the valve 47 against the compression spring 76 to first throttle the supply of gas to the auxiliary outlet 36 and then shut off the valve 46 and the supply of gas to said auxiliary outlet.

Upon continued turning movement of the knob 25 to a higher temperature range of adjustment of the thermostat, the two seating members 44 and 45 will move together away from the valves 46 and 47. When a temperature range of adjustment is reached at which the B. t. u. input of the main gas burner (not shown) is required to bring the oven up to the desired temperature, the two valves 46 and 47 will be moved off their seats, accommodating the flow of gas through the outlets 36 and 37.

It should here be understood that the further the seating member 45 is moved away from the valve 47 that the higher will be the temperature setting of the thermostat.

It should further be understood that the amplifying and compensating bimetallic lever 80 is provided, both to amplify the action of the thermal element 84 and to compensate for the heat of the adjacent burners of the range, as well as the heat generated by the oven, and that the bias of the bimetal compensating and amplifying lever is in a valve closing direction to amplify operation of the thermostat 84, the amplification herein being in a ratio of 3 to 1, and compensating for the various extraneous temperatures to which the valve may be subjected.

It will be understood that various modifications and variations of the present invention may be effected without departing from the spirit and scope of the novel concepts thereof.

I claim as my invention:

1. In a thermostatic gas valve for controlling main and auxiliary gas burners, a valve body having a chamber therein, an inlet into said chamber, an auxiliary outlet from said chamber, a main burner outlet from said chamber spaced downstream from said auxiliary outlet, two spaced valve seats in said chamber, individual separately operable valves in said chamber, each being engageable with one of said seats, one seat and valve controlling the passage of gas through said auxiliary outlet and the other seat and valve controlling the passage of gas through said main burner outlet, said valves being relatively movable with respect to each other to open and close at different temperature settings, and a thermostatic element having operative connection with each of said valves for closing said valves at different selected temperature settings.

2. In a thermostatic gas valve for controlling main and auxiliary gas burners, a valve body having a chamber therein, an inlet into said chamber, an auxiliary outlet from said chamber, a main burner outlet from said chamber spaced downstream from said auxiliary outlet, two spaced valve seats in said chamber, individual valves engageable with said seats, one seat and valve controlling the passage of gas through said auxiliary outlet and the other seat and valve controlling the passage of gas through said main burner outlet, a common stem for said valves, means biasing said valves in predetermined spaced relation along said stem and accommodating relative movement of said stem with respect to said valves, a thermostatic element having operative connection with each of said valves for individually closing said valves at different temperature settings, said valve seats being stationary during operation of said valves by said thermostatic element at a given temperature setting, and means for adjustably moving said valves seats with respect to said thermostatic element to change the temperature of operation of said valves.

3. In a thermostatic gas valve particularly adapted for gas appliances and the like having main and auxiliary gas burners, a valve body having a chamber therein, a main gas cock associated with said inlet for controlling the admission of gas into said chamber, an inlet into said chamber, an auxiliary outlet from said chamber, a main burner outlet from said chamber spaced downstream from said auxiliary outlet, two spaced valve seats in said chamber, individual aligned valves engageable with said seats, one seat and valve controlling the passage of gas through said auxiliary outlet and the other seat and valve controlling the passage of gas through said main burner outlet, means for adjustably moving said seats axially along said chamber to vary the temperature range of operation of said valves, a common stem for said valves, means biasing said valves in predetermined space relation with respect to said stem and accommodating relative movement of said stem with respect to said valves, a thermostatic element having operative connection with said stem for closing said valves at different temperature settings, and means operable by turning movement of said gas cock in a direction to turn on the flow of gas from said inlet into said chamber for varying the temperature range of operation of said burner.

4. In a thermostatic gas valve particularly adapted for gas range ovens and the like having main and auxiliary gas burners, a valve body having a chamber therein, an inlet into said chamber, an auxiliary outlet from said chamber, a main burner outlet from said chamber spaced downstream from said auxiliary outlet, two aligned axially spaced valve seats mounted in said chamber for axial movement therealong, individual aligned valves engageable with said seats, one seat and valve controlling the passage of gas through said auxiliary outlet and the other seat and valve controlling the passage of gas through said main burner outlet, a common stem for said valves, said stem having spaced abutments thereon, spring means engaging said valves with said abutments and accommodating relative movement of said stem with respect to said valves to accommodate the closing of one valve after the other has been closed, other spring means biasing said valves toward an open position, a single thermostatic element having operative connection with said stem for moving said stem to close said valves at different temperature settings, said seats being stationary during operation of said valves by said thermostatic element at a given temperature setting, and means for adjustably moving said seats along said valve chamber to vary the temperature settings of said valves.

5. In a thermostatic gas valve particularly adapted for gas range ovens and the like having main and auxiliary gas burners, a valve body having a chamber therein, a main gas cock rotatably mounted in said body and controlling the admission of gas into said chamber, an inlet into said chamber, an auxiliary outlet from said chamber, a main burner outlet from said chamber spaced downwardly from said auxiliary outlet, two axially spaced aligned valve seats mounted in said chamber for axial movement therealong, individual aligned valves engageable with said seats, one seat and valve controlling the passage of gas through said auxiliary outlet and the other seat and valve controlling the passage of gas through said main burner outlet, individual stems for each of said valves having abutment surfaces on the ends thereof, said stems being axially aligned and one being threaded within the other to accommodate the spacing of said valves to be varied, spring means biasing said valves into engagement with said abutment surfaces and accommodating relative movement of said stems with respect to said valves, a thermostatic element extensible within said chamber and having operative connection with said stems for moving said stems in a valve closing direction, and means operable by turning movement of said gas cock for adjustably moving said seats along said chamber to vary the temperature range of closing of said valves.

6. In a thermostatic gas burner control valve, a valve body having a valve chamber therein, an inlet into said valve body, a rotary valve mounted in said valve body and controlling the admission of gas from said inlet to said valve chamber, a by-pass outlet from said chamber, a second outlet from said chamber spaced downstream from said by-pass outlet, a third outlet from said chamber spaced downstream from said second outlet, two spaced valve seats and individual valves engageable with said seats and operable to engage and be disengaged from said seats at different temperature settings, one seat and valve being between said by-pass outlet and said second outlet and the other seat and valve being between said second outlet and said third outlet for individually controlling the passage of gas respectively through said second and third outlets dependent upon the temperature setting of the thermostat, a spring biasing said valves in open positions, and a thermostatic element having yieldable connection with both of said valves to accommodate the closing of one of said valves by operation of said thermostatic element when the other is closed, said seats being stationary during operation of said valves by said thermostatic element at any given temperature setting thereof.

7. In a gas burner control valve particularly adapted for ovens and the like, a valve body having a valve chamber therein, a thermostatic element within said valve chamber and operable to control the flow of gas from said valve chamber in accordance with certain predetermined oven temperatures, an inlet into said valve body, a rotary valve controlling the passage of gas from said inlet into said valve chamber, an outlet from said chamber, a second outlet spaced downstream from said first outlet, a valve seat in said chamber on the upstream side of said first outlet, a second valve seat in said chamber on the downstream side of said first outlet and on the upstream side of said second outlet, a first valve engageable with said first seat, a second valve engageable with said second seat, a common stem for said valves, means yieldably biasing said valves into engagement with said stem and accommodating relative movement of said valves with respect to said stem and engagement with and disengagement from said seats individually of each other at different temperature settings, an operative connection between said thermostatic element and said stem for closing one or the other of said valves depending upon the temperature setting of the thermostat, and a connection from said rotary valve for varying the setting of the thermostat.

8. In a gas burner control valve particularly adapted for gas range ovens and the like, a valve body having a chamber therein, an inlet into said chamber, a rotary valve for admitting gas from said inlet to said chamber, an auxiliary gas supply outlet leading from said chamber, a main gas supply outlet leading from said chamber on the downstream side of said auxiliary gas supply outlet, two axially spaced valve seats in said chamber, one being on the upstream side of said auxiliary gas supply outlet and a second being on the downstream side of said auxiliary gas supply outlet and on the upstream side of said main burner supply outlet, a first valve engageable with said one seat, a second valve engageable with said second seat, a common stem for said valves, spring means engaging said valves with said stem for moving said valves therewith and accommodating relative movement of one of said valves with respect to the other to close said first valve when said second valve is closed by axial movement of said stem, means operated by said rotary valve for varying the relative positions of said seats with respect to said valves and the operating temperature of the valve and a thermostatic element having operative connection with said stem for moving said valves into closed positions dependent upon the temperature setting thereof.

9. In a gas burner control valve particularly adapted for gas range ovens and the like, a valve body having a chamber therein, an inlet into said chamber, a rotary valve for admitting gas from said inlet to said chamber, an auxiliary gas supply outlet leading from said chamber, a main gas supply outlet leading from said chamber on the downstream side of said auxiliary gas supply outlet, two axially spaced valve seats in said chamber, one being on the upstream side of said auxiliary gas supply outlet and a second being on the downstream side of said auxiliary gas supply outlet and on the upstream side of said main burner supply outlet, a first valve engageable with said one seat, a second valve engageable with said second seat, a common stem for said valves, spring means engaging said valves with said stem for moving said valves therewith and accommodating relative movement of one of said valves with respect to the other to close said first valve when said second valve is closed by axial movement of said stem, an operative connection between said rotary valve and said seats for varying the relative positions of said seats with respect to said valves, and a thermostatic element having a bulb in association with the gas range oven and a diaphragm having operative connection with said stem for closing said first and second valves in accordance with the temperature setting thereof.

10. In a gas burner control valve particularly adapted for gas range ovens and the like, a valve body having a chamber therein, an inlet into said chamber, a rotary valve for admitting gas from said inlet to said chamber, an auxiliary gas supply outlet leading from said chamber, a main gas supply outlet leading from said chamber on the downstream side of said auxiliary gas supply outlet, two axially spaced valve seats in said chamber, one being on the upstream side of said auxiliary gas supply outlet and a second being on the downstream side of said auxiliary gas supply outlet and on the upstream side of said main burner supply outlet, a first valve engageable with said one seat, a second valve engageable with said second seat at a different temperature setting from the temperature setting said first valve comes into engagement with said one seat, a common stem for said valves, spring means engaging said valves with said stem for moving said valves therewith and accommodating relative movement of one of said valves with respect to the other to close said first valve when said second valve is closed by axial movement of said stem, a thermostatic element having a bulb in association with the gas range oven and a diaphragm having operative connection with said stem, the operative connection between said diaphragm and said stem comprising a bimetal compensating and amplifying lever having connection with the outer end of said stem at one end, having engagement with a fixed fulcrum at its opposite end and being operatively connected with said diaphragm intermediate its ends, said seats being stationary during operation of said valves by said thermostatic element at a given temperature setting.

11. In a thermostatically operated gas oven burner control valve, a valve body having a valve chamber therein, a thermostatic element within said chamber and having temperature sensitive means for association with a gas range oven, an inlet into said body, a rotary valve controlling the passage of gas from said inlet into said body, two spaced outlets leading from said valve body, one being an auxiliary outlet, another being an outlet for main burner gas, a valve seat in said chamber mounted for adjustable movement therealong and positioned on the upstream side of said auxiliary outlet, a second seat in said chamber mounted for adjustable movement therealong and having connection with said first seat to be adjustably moved along said chamber upon adjustable movement of said first seat, a valve stem extending axially through said seats, a first valve on said stem engageable with said first seat, a second valve on said stem engageable with said second seat, yieldable means on said stem urging said valves toward their respective seats and accommodating relative movement of said stem with respect to said valves to effect the closing of said first valve when said second valve is closed, an operative connection between said thermostatic element and said stem for effecting the closing of said valves at predetermined temperatures in accordance with the positions of said seats in said valve chamber, said seats being stationary during operation of valves by said thermostatic element at a given temperature setting, and an operative connection between said rotary valve and said seats for adjustably moving said seats along said chamber and varying the temperature range of closing of said valves.

12. A thermostatically operated gas burner control valve particularly adapted for gas range ovens and the like having main and auxiliary gas burners, comprising a valve body having a valve chamber therein, an inlet passageway leading into said chamber, a rotary valve in said valve body, for controlling the admission of gas to said chamber, a first outlet from said chamber, a second outlet from said chamber spaced on the downstream side of said first outlet, two axially aligned valve seats in said chamber mounted for adjustable movement therealong, a first valve seat being on the upstream side of said first outlet and a second valve seat being on the downstream side of said first outlet and the upstream side of said second outlet, a first valve engageable with said first valve seat, a second valve engageable with said second valve seat, a common stem for said valves, spring means biasing said valves in predetermined positions along said stem and accommodating relative movement of said stem with respect to said valves, a thermostatic element in said chamber having operative connection with said stem for moving said stem in a valve closing direction, said valve seats being stationary during operation of said valves by said thermostatic element at a given temperature setting, and an operative connection between said rotary valve and said valve seats for adjustably moving said valve seats along said chamber and varying the temperature range of closing of said valves.

13. A thermostatically operated gas burner control valve particularly adapted for gas range ovens and the like having main and auxiliary gas burners, a valve body having a valve chamber therein, an inlet passageway leading into said chamber, a rotary valve in said valve body, for controlling the admission of gas to said chamber, a first outlet from said chamber, a second outlet from said chamber spaced on the downstream side of said first outlet, two axially aligned valve seats in said chamber mounted for adjustable movement therealong, a first valve seat being on the upstream side of said first outlet and a second valve seat being on the downstream side of said first outlet and the upstream side of said second outlet, a first valve engageable with said first valve seat, a second valve engageable with said second valve seat, individual stems for each of said valves having abutment surfaces on the ends thereof, said stems being axially aligned and one being threaded within the other to vary the spacing of said valves, spring means biasing said valves into engagement with said abutment surfaces, and accommodating relative movement of said stems with respect to said valves, a thermostatic element extensible within said valve body and having operative connection with said stem for moving said stem in a valve closing direction, and an operative connection between said rotary valve and said seats for adjustably moving said seats along said chamber and varying the temperature range of closing of said valves.

14. A thermostatically operated gas burner control valve particularly adapted for gas range ovens and the like having main and auxiliary gas burners, a valve body having a valve chamber therein, an inlet passageway leading into said chamber, a rotary valve in said valve body for controlling the admission of gas to said chamber, a first outlet from said chamber, a second outlet from said chamber spaced on the downstream side of said first outlet, a first seat threaded within said chamber on the upstream side of said first outlet, a second seat threaded within said chamber on the downstream side of said first outlet and upstream side of said second outlet, a valve stem in axial alignment with the axis of rotation of said rotary valve, a thermostatic element having engagement with said valve stem for moving said stem along said chamber in the direction of the axis of said rotary valve, said stem having spaced abutments thereon, a first valve engageable with the innermost of said abutments, spring means yieldably maintaining said valve in engagement with said abutment, a second valve engageable with the second of said abutments, spring means for yieldably maintaining said valve in engagement with said last mentioned abutment, said first and second valves being engageable with said first and second seats to block the passage of gas therethrough upon predetermined temperature conditions, spring means urging said valves into open positions and moving said thermostatic element in a return direction, and an operative connection between said rotary valve and said valve seats for turning the same to effect axial movement thereof along said valve chamber and vary the temperature range of closing of said valves.

15. A thermostatically operated gas burner control valve particularly adapted for gas range ovens and the like having main and auxiliary gas burners, a valve body having a valve chamber therein, an inlet passageway leading into said chamber, a rotary valve in said valve body for controlling the admission of gas to said chamber, a first outlet from said chamber, a second outlet from said chamber spaced on the downstream side of said first outlet, a first seat threaded within said chamber on the upstream side of said first outlet, a second seat threaded within said chamber on the downstream side of said first outlet and upstream side of said second outlet, a valve stem in axial alignment with the axis of rotation of said rotary valve, a thermostatic element having engagement with said valve stem for moving said stem along said chamber in the direction of the axis of said rotary valve, said stem having spaced abutments thereon, a first valve engageable with the innermost of said abutments, spring means yieldably maintaining said valve in engagement with said abutment, a second valve engageable with the second of said abutments, spring means for yieldably maintaining said valve in engagement with said last mentioned abutment, said first and second valves being engageable with said first and second seats to block the passage of gas therethrough upon predetermined temperature conditions, spring means urging said valves into open positions and moving said thermostatic element in a return direction, and an operative connection between said rotary valve and said valve seats for turning the same to effect axial movement thereof along said valve chamber and varying the temperature range of closing of said valves, said valve seats being separate and having a slidable interengaging connection therebetween to effect rotation of said seats together and to accommodate axial adjustment of said seats with respect to each other, and an operative connection between said rotary valve and said valve seats for turning said seats together upon turning movement of said rotary valve, to effect axial movement of said seats along said valve chamber and vary the temperature range of closing of said valves.

References Cited in the file of this patent

UNITED STATES PATENTS

| | | |
|---|---|---|
| 2,121,977 | Newell | June 28, 1938 |
| 2,200,226 | Larson | May 7, 1940 |
| 2,242,718 | Dynes | May 20, 1941 |
| 2,505,455 | Andersson | Apr. 25, 1950 |
| 2,616,661 | Mills | Nov. 4, 1952 |
| 2,664,246 | Ray | Dec. 29, 1953 |
| 2,702,052 | Grayson | Feb. 15, 1955 |